(12) United States Patent
Yang et al.

(10) Patent No.: US 11,044,081 B2
(45) Date of Patent: Jun. 22, 2021

(54) SYSTEM AND METHOD FOR OBTAINING A COMMON SESSION KEY BETWEEN DEVICES

(71) Applicant: HUAWEI INTERNATIONAL PTE. LTD., Singapore (SG)

(72) Inventors: Yanjiang Yang, Singapore (SG); Jie Shi, Singapore (SG); Guilin Wang, Singapore (SG)

(73) Assignee: Huawei International Pte. Ltd., Singapore (SG)

( * ) Notice: Subject to any disclaimer, the term of this patent is extended or adjusted under 35 U.S.C. 154(b) by 91 days.

(21) Appl. No.: 16/258,109

(22) Filed: Jan. 25, 2019

(65) Prior Publication Data
US 2019/0173671 A1 Jun. 6, 2019

Related U.S. Application Data

(63) Continuation of application No. PCT/SG2017/050161, filed on Mar. 28, 2017.

(30) Foreign Application Priority Data

Jul. 26, 2016 (SG) .............................. 10201606164T (51) Int. Cl.
*H04L 9/08* (2006.01)
*H04L 9/32* (2006.01)
(Continued)

(52) U.S. Cl.
CPC .......... *H04L 9/0841* (2013.01); *H04L 9/0643* (2013.01); *H04L 9/0866* (2013.01);
(Continued)

(58) Field of Classification Search
None
See application file for complete search history.

(56) References Cited

U.S. PATENT DOCUMENTS

| 7,353,395 | B2 | 4/2008 | Gentry et al. |
| 7,747,865 | B2 * | 6/2010 | Krawczyk ............ H04L 9/3066 |
| | | | 713/180 |

(Continued)

FOREIGN PATENT DOCUMENTS

| CN | 101052033 A | 10/2007 |
| CN | 101116281 A | 1/2008 |

(Continued)

OTHER PUBLICATIONS

Liu et al., "Efficient Online/Offline Identity-Based Signature for Wireless Sensor Network," Cryptology ePrint Archive, [online], Report 2010/003, Ver. 20100514:034016, pp. 1-16, International Association for Cryptologic Research, Bellevue, Washington (May 2010).

(Continued)

*Primary Examiner* — Brandon S Hoffman
(74) *Attorney, Agent, or Firm* — Leydig, Voit & Mayer, Ltd.

(57) ABSTRACT

This document describes a system and method for generating a common session key for encoding digital communications between devices. In particular, the system allows two devices to verify the veracity of each device before these authenticated devices proceed to generate a common session key that is then utilized to encode digital communications between these two devices.

16 Claims, 6 Drawing Sheets

(51) Int. Cl.
   *H04L 9/06*  (2006.01)
   *H04L 29/06*  (2006.01)
(52) U.S. Cl.
   CPC .......... *H04L 9/0869* (2013.01); *H04L 9/3247* (2013.01); *H04L 63/123* (2013.01)

(56) References Cited

U.S. PATENT DOCUMENTS

| | | |
|---|---|---|
| 2006/0215837 A1 | 9/2006 | Chen et al. |
| 2010/0199095 A1 | 8/2010 | Ho |
| 2014/0169557 A1 | 6/2014 | Gammel et al. |

FOREIGN PATENT DOCUMENTS

| | | |
|---|---|---|
| CN | 101179380 A | 5/2008 |
| CN | 101702804 A | 5/2010 |
| CN | 102315937 A | 1/2012 |
| CN | 105391734 A | 3/2016 |
| EP | 2106090 A1 | 9/2009 |

OTHER PUBLICATIONS

Menezes et al., "Handbook of Applied Cryptography: Chapter 12: Key Establishment Protocols ED", [CRC Press Series on Discrete Mathematices and Its Applications], CRC Press, Boca Raton, FL, pp. 489-541, Oct. 1, 1996, www.cacr.math.uwaterloo.ca/hac.
Menezes et al., "Handbook of Applied Cryptography: Chapter 11: Digital Signatures ED", [CRC Press Series on Discrete Mathematices and Its Applications], CRC Press, Boca Raton, FL, pp. 425-488, Oct. 1, 1996, www.cacr.math.uwaterloo.ca/hac.
Bellare et al., "Security Proofs for Identity-Based Identification and Signature Schemes", Journal of Cryptology, 22(1): 1-61 (2009).
Garcia-Morchon et al., "DTLS-HIMMO: Achieving DTLS Certificate Security with Symmetric Key Overhead", In Proc. 20th European Symposium on Research in Computer Security, Vienna, Austria, Sep. 21-25, 2015, Computer Security—ESORICS 2015, LNCS 9326, 552 pages.
Blundo, et al., "Perfectly Secure Key Distribution for Dynamic Conferences", Information and Computation, 146(1): 1-23 (1998).
Elgamal, "A Public Key Cryptosystem and a Signature Scheme Based on Discrete Logarithms", IEEE Transactions on Information Theory, IT-31(4): 469-472, Jul. 1985.
Schnorr, "Efficient Identification and Signatures for Smart Cards", Conference on the Theory and Application of Cryptology, Advances in Cryptology—CRYPT0 '89, LNCS 435, pp. 239-252 (1990).
Accredited Standards Committee X9, American National Standard X9.62-2005, Public Key Cryptography for the Financial Services Industry, The Elliptic Curve Digital Signature Algorithm (ECDSA), Nov. 16, 2005, 17 pages.
Arkko et al., "MIKEY: Multimedia Internet KEYing", Network Working Group, RFC: 3830, Aug. 2004, 66 pages.
Groves, et al., "Elliptic Curve-Based Certificateless Signatures for Identity-Based Encryption (ECCSI)", Internet Engineering Task Force (IETF), RFC: 6507, Feb. 2012, 17 pages.
Groves, "Sakai-Kasahara Key Encryption (SAKKE)", RFC: 6508, Feb. 2012, 21 pages.
Groves, "Mikey-Sakke: Sakai-Kasahara Key Encryption in Multimedia Internet KEYing (MIKEY)", RFC: 6509, Feb. 2012, 21 pages.
CN/201780045775, Office Action, dated Feb. 2, 2021.

\* cited by examiner

SYSTEM AND METHOD FOR OBTAINING A COMMON SESSION KEY BETWEEN DEVICES

CROSS-REFERENCE TO RELATED APPLICATIONS

This application is a continuation of International Application No. PCT/SG2017/050161, filed on Mar. 28, 2017, which claims priority to Singaporean Patent Application No. 10201606164T, filed on Jul. 26, 2016. The disclosures of the aforementioned applications are hereby incorporated by reference in their entireties.

FIELD OF THE DISCLOSURE

Embodiments of this disclosure relate to a system and method for generating a common session key for encoding digital communications between devices. In particular, the system allows two devices to verify the veracity of each device before these authenticated devices proceed to generate a common session key that is then utilized to encode digital communications between these two devices.

BACKGROUND

Due to a convergence of multiple technologies, an ever increasing number of devices are now able to seamlessly communicate wirelessly with the Internet or wirelessly exchange communications between themselves. This convergence has resulted in the vision of the Internet of Things (IoT) gaining more traction through recent years. In the Internet of Things, millions of entities or devices (i.e. Things) will be connected to one another. These devices, which comprise devices or entities such as smart chips, smart plugs, smart watches, smart phones, smart vehicles, smart buildings, and etc., either communicate directly with one another or via the Internet.

As the Internet of Things spreads into more areas, these devices become more prone to cyber-attacks from hackers or unauthorized users as a compromised device would grant a malicious user access to the network to which the device belongs. Hence, it is of utmost importance that a security protocol be set in place to allow one entity to verify the authenticity of a peer entity, with which it communicates with, before data is exchanged between these two entities. In addition to the above, once the authenticity of the entities have been verified, a secret key known to only these two entities, has to be established to facilitate the signing of data messages between these entities. This is to ensure that data communicated between these two entities will not be compromised even if the data were intercepted or redirected.

A common method of establishing a secret key for signing data communications between entities involves the pre-sharing of a common symmetric secret key between the relevant parties. For such a method, data messages that are to be transmitted between the entities will be signed using this pre-shared or pre-agreed-upon secret key. If the receiving entity is able to decrypt the received message using this pre-shared secret key, this implies that the authenticity of the sender has been verified and the receiver may then proceed to process the decrypted message accordingly. Unfortunately, this method is not scalable and is quite inflexible as it requires the common secret to be pre-shared or communicated to all trusted entities or devices before the entities or devices may communicate with one another. In the IoT setting, the high mobility of devices is a norm and devices that are required to exchange data with one another may not have had the opportunity to establish a secret key beforehand.

Another approach that has been proposed utilizes public key infrastructure (PKI) based solutions whereby key-pairs allocated to each authorized entity are bound to its holders by means of a public key certificate. The key pair then utilizes a public key cryptosystem such as public-key encryption or digital signature methodologies to sign data messages or to verify the authenticity of a sender by validating the public key certificate of the sender. The setup and maintenance of such public key infrastructures are notoriously expensive and require entities to constantly maintain contact with a PKI server to validate the respective public key certificates.

Yet another approach that has been proposed utilizes identity based cryptography methodologies to authenticate entities and to sign data messages. Such identity based cryptosystems are special public key cryptosystems, which are based on bilinear pairing and utilize an entity's identity, such as user name, email address, telephone number, IP address, etc. as the public key and a corresponding private key is then derived from the entity's identity by a Key Generation Centre which contains a master secret key, which is utilized in the generation of private keys for entities. The downside of this approach is that bilinear pairing is an expensive and time consuming computation process.

For the above reasons, those skilled in the art are constantly striving to come up with a system and method to verify the authenticity of entities and to generate a common session key that is to be used to encode data messages between verified entities.

SUMMARY OF THE DISCLOSURE

The above and other problems are solved and an advance in the art is made by systems and methods provided by embodiments in accordance with the disclosure.

A first advantage of embodiments of systems and methods in accordance with the disclosure is that pairs of devices or entities are able to verify each other's authenticity and to generate a common session key independently and in an Internet of Things setting whereby these devices are not required to maintain constant communication with a Key Generating server.

A second advantage of embodiments of systems and methods in accordance with the disclosure is that the authentication of entities and the generation of a common session key methods are preferably implemented over elliptic curves (straightforwardly, they can also be implemented over finite fields) as such, results in high computational and communication performance.

A third advantage of embodiments of systems and method in accordance with the disclosure is that the implicit sharing of secret between entities greatly simplifies the authentication process of entities and the subsequent generation of a common session key for the authenticated entities.

The above advantages are provided by embodiments of a method in accordance with the disclosure operating in the following manner. For brevity, in the subsequent description of the embodiments of the disclosure, although multiplicative notations are utilized for arithmetic operations; it should be straightforward for a person skilled in the art to realize that the arithmetic operations should be described using additive notations when implemented over elliptic curves.

According to a first aspect of the disclosure, a method of generating a common session key $SK_{ij}$ for encoding digital communications between a first entity and a second entity comprises generating, by a secure server, a private key $sk_i$ for the first entity wherein the private key $sk_i$ comprises a Discrete-Logarithm type digital signature, $[R_i, s_i]$, of an identity of the first entity, $id_i$, and generating, by the secure server, a private key $sk_j$ for the second entity wherein the private key $sk_j$ comprises a Discrete-Logarithm type digital signature, $[R_j, s_j]$, of an identity of the second entity, $id_j$, wherein $R_i$ and $R_j$ are group elements, and $s_i$ and $s_j$ comprise integers modulo q, whereby q is a prime number, wherein the private key $sk_i$ is communicated to the first entity and the private key $sk_j$ is communicated to the second entity; sharing, by the first entity, a cryptographic nonce $N_i$, the identity of the first entity $id_i$, and $R_i$ with the second entity; calculating, by the second entity, an implicitly shared secret $k_{ji}$ using the shared $R_i$, and providing the implicitly shared secret $k_{ji}$, the cryptographic nonce $N_i$, and a cryptographic nonce $N_j$ to an Authentication Data Deriving Function to generate an authentication data $Ad_j$; sharing, by the second entity, the cryptographic nonce $N_j$, the identity of the second entity $id_j$, $R_j$, and the authentication data $Ad_j$ with the first entity; and calculating, by the first entity, the implicitly shared secret $k_{ij}$ using the shared $R_j$ and verifying the authentication data $Ad_j$ using the implicitly shared secret $k_{ij}$, the cryptographic nonce $N_i$, and the cryptographic nonce $N_j$, wherein if the authentication data $Ad_j$ is verified, generating the common session key $SK_{ij}$ by providing the implicitly shared secret $k_{ij}$, the cryptographic nonce $N_i$, the cryptographic nonce $N_j$, the identity of the first entity $id_i$ and the identity of the second entity $id_j$ to a Key Deriving Function.

With reference to the first aspect, in a first possible implementation manner of the first aspect, the method further comprises providing, by the first entity, the implicitly shared secret $k_{ij}$, the cryptographic nonce $N_i$, and the cryptographic nonce $N_j$ to the Authentication Data Deriving Function to generate an authentication data $Ad_i$, and communicating the authentication data $Ad_i$ to the second entity; and verifying, by the second entity, the authentication data $Ad_i$ using the implicitly shared secret $k_{ji}$, wherein if the authentication data $Ad_i$ is verified, providing the implicitly shared secret $k_{ji}$, the cryptographic nonce $N_i$, the cryptographic nonce $N_j$, the identity of the first entity $id_i$ and the identity of the second entity $id_j$ to the Key Deriving Function to generate the common session key $SK_{ij}$.

With reference to the first aspect or the first possible implementation manner of the first aspect, in a second possible implementation manner of the first aspect, the generation of the authentication data $Ad_j$ further comprises providing the identity of the first entity $id_i$ and the identity of the second entity $id_j$ to the Authentication Data Deriving Function.

With reference to the first or second possible implementation manners of the first aspect, in a third possible implementation manner of the first aspect, the generation of the authentication data $Ad_i$ further comprises providing the identity of the first entity $id_i$ and the identity of the second entity $id_j$ to the Authentication Data Deriving Function.

With reference to the first aspect, the first, second or third possible implementation manners of the first aspect, in a fourth possible implementation manner of the first aspect, the verifying the authentication data $Ad_j$ comprises providing the implicitly shared secret $k_{ij}$, the cryptographic nonce $N_i$, and the cryptographic nonce $N_j$ to the Authentication Data Deriving Function to obtain a result, and determining if the result matches with authentication data $Ad_j$, whereby if a match is found, verifying the authentication data $Ad_j$.

With reference to the first, second, third or fourth possible implementation manners of the first aspect, in a fifth possible implementation manner of the first aspect, the verifying of the authentication data $Ad_i$ comprises providing the implicitly shared secret $k_{ij}$, the cryptographic nonce $N_i$, and the cryptographic nonce $N_j$ to the Authentication Data Deriving Function to obtain a result, and determining if the result matches with authentication data $Ad_i$, whereby if a match is found, verifying the authentication data $Ad_i$.

With reference to the first aspect, in a sixth possible implementation manners of the first aspect, the cryptographic nonce $N_i$ comprises $g^a$ where a is a random number.

With reference to the first aspect or the sixth possible implementation manners of the first aspect, in a seventh possible implementation manner of the first aspect, the cryptographic nonce $N_j$ comprises $g^b$ where b is a random number.

With reference to the first aspect, or the first to the seventh possible implementation manners of the first aspect, in an eighth possible implementation manner of the first aspect, the Authentication Data Deriving Function comprises a Message Authentication Code (MAC) function.

With reference to the first aspect, or the first to the eighth possible implementation manner of the first aspect, in a ninth possible implementation manner of the first aspect, the Key Deriving Function comprises a collision-resistant hash function.

With reference to the first aspect, or the first to the ninth possible implementation manners of the first aspect, in a tenth possible implementation manner of the first aspect, the private key $sk_i$ is a Schnorr signature of the identity of the first entity, $id_i$, where $R_i=g^{r_i}$, and $s_i=r_i+xH(R_i, id_i)$ (modulo q), and wherein the private key $sk_j$ is a Schnorr signature of the identity of the second entity, $id_j$, where $R_j=g^{r_j}$ and $s_j=r_j+xH(R_j, id_j)$ (modulo q), where $r_i$ and $r_j$ are random numbers, x is master secret key, and H( ) is a collision-resistant hash function and wherein the implicitly shared secret $k_{ji}=g^{si \cdot sj}$, and the implicitly shared secret $k_{ij}=g^{sj \cdot si}$, where g is a generator of a cyclic group G.

With reference to the first aspect, or the first to the ninth possible implementation manners of the first aspect, in an eleventh possible implementation manner of the first aspect, the private key $sk_i$ is a first variant of an ElGamal signature of the identity of the first entity, $id_i$, where $R_i=g^{r_i}$, and $s_i=x^{-1} \cdot (H(id_i)-r_i \cdot R_i)$ (modulo q), and wherein the private key $sk_j$ is a first variant of an ElGamal signature of the identity of the second entity, $id_j$, where $R_j=g^{r_j}$ and $s_j=x^{-1} \cdot (H(id_j)-r_j \cdot R_j)$ (modulo q), where $r_i$ and $r_j$ are random numbers, x is master secret key, and H( ) is a collision-resistant hash function. In this case, $k_{ji}=y^{si \cdot sj}$ and $k_{ij}=y^{sj \cdot si}$, where $y=g^x$ is master public key.

With reference to the first aspect, or the first to the ninth possible implementation manners of the first aspect, in a twelfth possible implementation manner of the first aspect, the private key $sk_i$ is a second variant of an ElGamal signature of the identity of the first entity, $id_i$, where $R_i=g^{r_i}$, and $s_i=xR_i+r_i \cdot H(id_i)$ (modulo q), and wherein the private key $sk_j$ is a second variant of an ElGamal signature of the identity of the second entity, $id_j$, where $R_j=g^{r_j}$ and $s_j=xR_j+r_j \cdot H(id_j)$ (modulo q), where $r_i$ and $r_j$ are random numbers, x is master secret key, and H( ) is a collision-resistant hash function wherein the implicitly shared secret $k_{ji}=g^{si \cdot sj}$, and the implicitly shared secret $k_{ij}=g^{sj \cdot si}$, where g is a generator of a cyclic group G.

With reference to the first aspect, or the first to the ninth possible implementation manners of the first aspect, in a thirteenth possible implementation manner of the first aspect, the private key $sk_i$ is a third variant of an ElGamal signature of the identity of the first entity, $id_i$, where $R_i=g^{r_i}$, and $s_i=x\cdot H(id_i)+r_i\cdot R_i$ (modulo q), and wherein the private key $sk_j$ is a third variant of an ElGamal signature of the identity of the second entity, $id_j$, where $R_j=g^{r_j}$ and $s_j=x\cdot H(id_j)+r_j\cdot R_j$ (modulo q), where $r_i$ and $r_j$ are random numbers, x is master secret key, and H( ) is a collision-resistant hash function wherein the implicitly shared secret $k_{ji}=g^{si\cdot sj}$, and the implicitly shared secret $k_{ij}=g^{sj\cdot si}$, where g is a generator of a cyclic group G.

With reference to the first aspect, or the first to the ninth possible implementation manners of the first aspect, in a fourteenth possible implementation manner of the first aspect, the private key $sk_i$ is a fourth variant of an ElGamal signature of the identity of the first entity, $id_i$, where $R_i=g^{r_i}$, and $s_i=x^{-1}\cdot(R_i-r_i\cdot H(id_i))$ (modulo q), and wherein the private key $sk_j$ is a fourth variant of an ElGamal signature of the identity of the second entity, $id_j$, where $R_j=g^{r_j}$ and $s_j=x^{-1}\cdot(R_j-r_j\cdot H(id_j))$ (modulo q), where $r_i$ and $r_j$ are random numbers, x is a master secret key, and H( ) is a collision-resistant hash function. In this case, $k_{ji}=y^{si\cdot sj}$ and $k_{ij}=y^{sj\cdot si}$, where $y=g^x$ is master public key.

According to a second aspect of the disclosure, a method of generating a common session key $SK_{ij}$ for encoding digital communications between a first entity and a second entity comprises generating, by a secure server, a private key $sk_i$ for the first entity wherein the private key $sk_i$ comprises a Discrete-Logarithm type digital signature, $[R_i, s_i]$, of an identity of the first entity, $id_i$, and generating, by the secure server, a private key $sk_j$ for the second entity wherein the private key $sk_j$ comprises a Discrete-Logarithm type digital signature, $[R_j, s_j]$, of an identity of the second entity, $id_j$, wherein $R_i$ and $R_j$ are group elements, and $s_i$ and $s_j$ comprise integers modulo q, whereby q is a prime number, wherein the private key $sk_i$ is communicated to the first entity and the private key $sk_j$ is communicated to the second entity; sharing, by the first entity, a cryptographic nonce $N_i$, the identity of the first entity $id_i$, and $R_i$ with the second entity; calculating, by the second entity, an implicitly shared secret $k_{ji}=g^{si\cdot sj}$, using the shared $R_i$, where g is a generator of a cyclic group G, and calculating the common session key $SK_{ji}$ by providing the implicitly shared secret $k_{ji}$, the cryptographic nonce $N_i$, the cryptographic nonce $N_j$, the identity of the first entity $id_i$ and the identity of the second entity $id_j$ to the Key Deriving Function, and providing the common session key $SK_{ji}$, the cryptographic nonce $N_i$, and a cryptographic nonce $N_j$ to an Authentication Data Deriving Function to generate an authentication data $Ad_j$; sharing, by the second entity, the cryptographic nonce $N_j$, the identity of the second entity $id_j$, $R_j$, and the authentication data $Ad_j$ with the first entity; and calculating, by the first entity, an implicitly shared secret $k_{ij}=g^{sj\cdot si}$, using the shared $R_j$, and calculating a common session key $SK_{ij}$ by providing the implicitly shared secret $k_{ji}$, the cryptographic nonce $N_i$, the cryptographic nonce $N_j$, the identity of the first entity $id_i$ and the identity of the second entity $id_j$ to the Key Deriving Function and verifying the authentication data $Ad_j$ using the common session key $SK_{ij}$, the cryptographic nonce $N_i$, and the cryptographic nonce $N_j$, wherein if the authentication data $Ad_j$ is verified, using the common session key $SK_{ij}$ or $SK_{ji}$ as the common session key for encoding digital communications between a first entity and a second entity.

BRIEF DESCRIPTION OF THE DRAWINGS

The above advantages and features in accordance with this disclosure are described in the following detailed description and are shown in the following drawings.

DETAILED DESCRIPTION

This disclosure relates to a system and method for generating a common session key for encoding digital communications between devices. In particular, before the common session key is calculated, an entity-pair will first verify the veracity of each entity or device. Once these entities have been authenticated, the entity-pair will then proceed to generate a common session key that is then utilized to encode digital communications between these entities.

Figure 1:
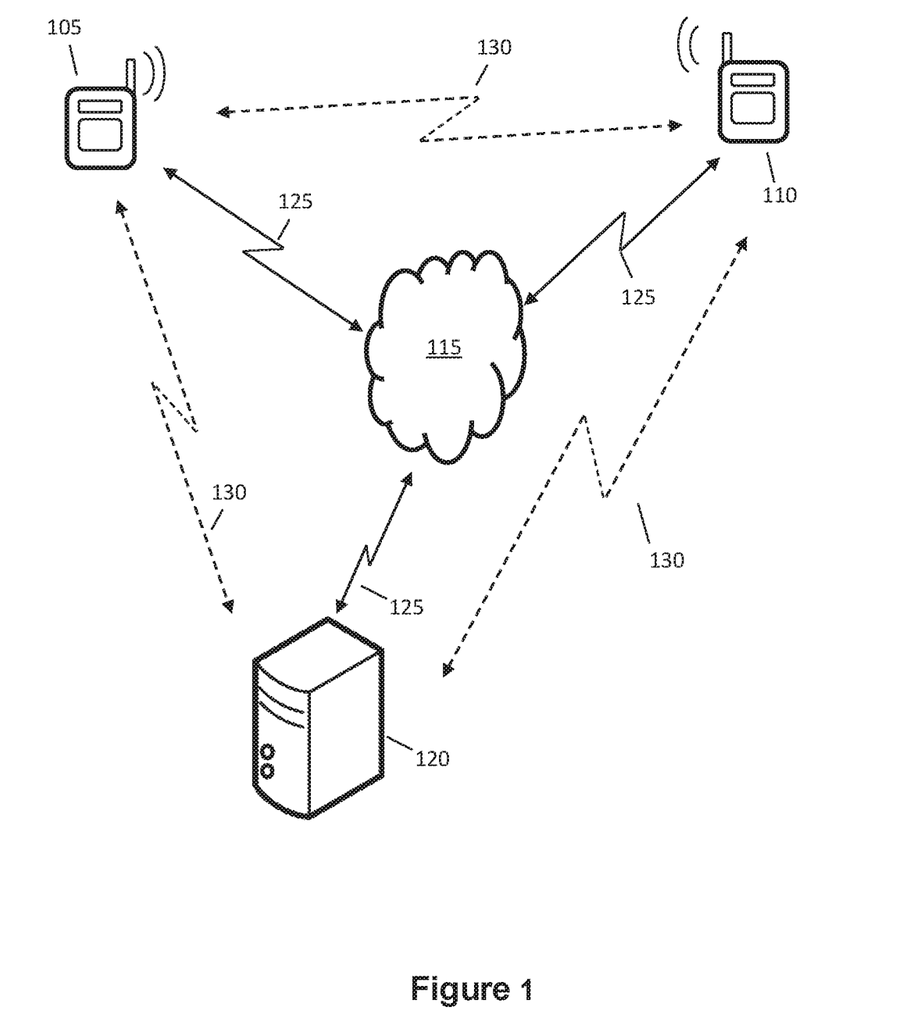
FIG. 1 illustrating a block diagram representative of an entity-pair authentication and a common session key generation system for the authenticated entity-pair in accordance with embodiments of the disclosure.

FIG. 1 illustrates a block diagram of an entity-pair authentication and a common session key generation system in accordance with embodiments of the disclosure. The system illustrated in FIG. 1 comprises entities 105, 110, that are wirelessly connected to secure server 120. Entities 105 and 110 each may comprise, but is not limited to, any device that is able to carry out wireless communicative functions such as a smart phone, a tablet computer, a mobile computer, a netbook, a wearable electronic device such as smart watch, smart plugs, or transceivers that may be found in smart devices or Internet of Things (IoT) enabled devices, and etc.

As for secure server 120, this server may comprise a secure cloud server or a remotely located secure server which is able to communicate wirelessly with entities 105 and 110 either through Internet 115 or directly with entities 105 and 110. If server 120 is configured to communicate with entities 105 and 110 through Internet 115, server 120 may do so via wired networks or wireless networks 125 such as, but are not limited to, cellular networks, satellite networks, telecommunication networks, or Wide Area Networks (WAN). Alternatively, if server 120 is configured to communicate directly with entities 105 and 110, this may be accomplished through wireless networks 130 such as, but not limited to, Wireless-Fidelity (Wi-Fi), Bluetooth, or Near Field Communication (NFC). It should be noted that entities 105 and 110 may utilize either one of wireless network 125 (via the Internet) or wireless network 130 (direct communication) to exchange data messages with one another.

Figure 2:
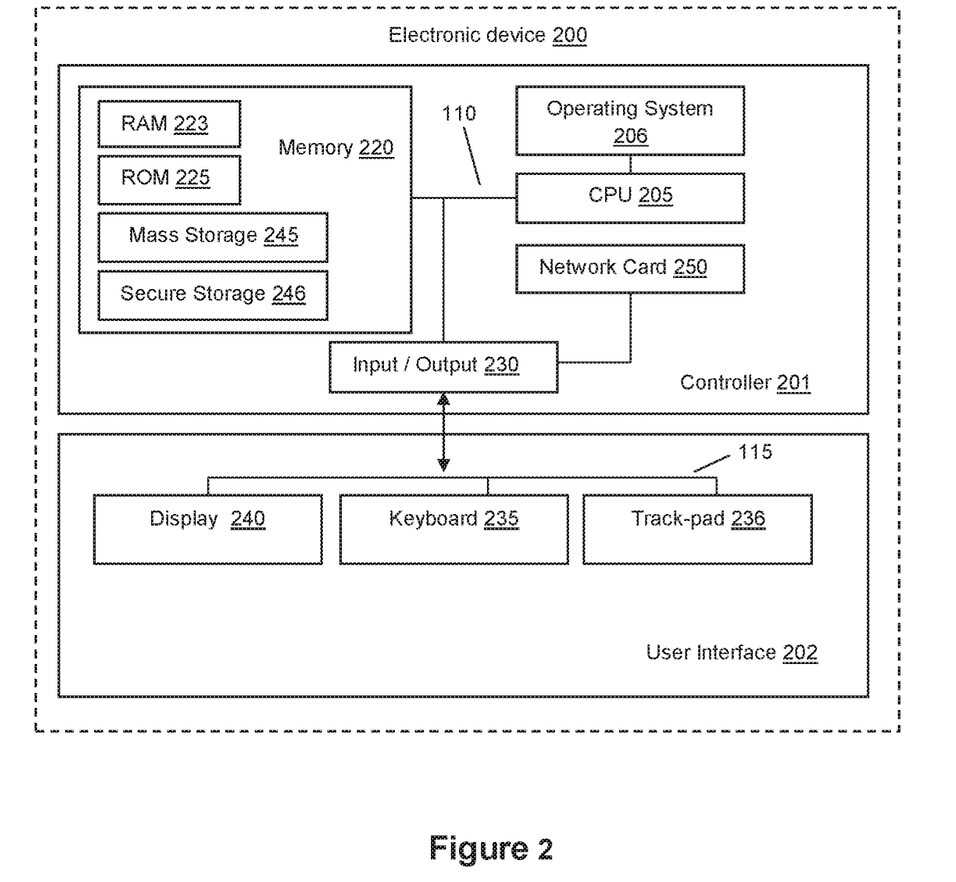
FIG. 2 illustrating a block diagram representative of components in an electronic device or server for implementing embodiments in accordance with embodiments of the disclosure.

FIG. 2 illustrates a block diagram representative of components of an electronic device 200 that is provided within entities 105, 110 and server 120 for implementing embodiments in accordance with embodiments of the disclosure.

One skilled in the art will recognize that the exact configuration of each electronic device provided within the entities or the server may be different and the exact configuration of electronic device 200 may vary and FIG. 2 is provided by way of example only.

In embodiments of the disclosure, device 200 comprises controller 201 and user interface 202. User interface 202 is arranged to enable manual interactions between a user and electronic device 200 and for this purpose includes the input/output components required for the user to enter instructions to control electronic device 200. A person skilled in the art will recognize that components of user interface 202 may vary from embodiment to embodiment but will typically include one or more of display 240, keyboard 235 and track-pad 236.

Controller 201 is in data communication with user interface 202 via bus 215 and includes memory 220, Central Processing Unit (CPU) 205 mounted on a circuit board that processes instructions and data for performing the method of this embodiment, an operating system 206, an input/output (I/O) interface 230 for communicating with user interface 202 and a communications interface, in this embodiment in the form of a network card 250. Network card 250 may, for example, be utilized to send data from electronic device 200 via a wired or wireless network to other processing devices or to receive data via the wired or wireless network. Wireless networks that may be utilized by network card 250 include, but are not limited to, Wireless-Fidelity (Wi-Fi), Bluetooth, Near Field Communication (NFC), cellular networks, satellite networks, telecommunication networks, Wide Area Networks (WAN) and etc.

Memory 220 and operating system 206 are in data communication with CPU 205 via bus 210. The memory components include both volatile and non-volatile memory and more than one of each type of memory, including Random Access Memory (RAM) 220, Read Only Memory (ROM) 225 and a mass storage device 245, the last comprising one or more solid-state drives (SSDs). Memory 220 also includes secure storage 246 for securely storing secret keys, or private keys. It should be noted that the contents within secure storage 246 are only accessible by a super-user or administrator of device 200 and may not be accessed by any user of device 200. One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 220 may include a kernel and/or programming modules such as a software application that may be stored in either volatile or non-volatile memory.

Herein the term "CPU" is used to refer generically to any device or component that can process such instructions and may include: a microprocessor, microcontroller, programmable logic device or other computational device. That is, CPU 205 may be provided by any suitable logic circuitry for receiving inputs, processing them in accordance with instructions stored in memory and generating outputs (for example to the memory components or on display 240). In this embodiment, CPU 205 may be a single core or multi-core processor with memory addressable space. In one example, CPU 205 may be multi-core, comprising—for example—an 8 core CPU.

Referring back to FIG. 1, prior to adding entities 105 and 110 to the entity-pair authentication and the common session key generation system in accordance with embodiments of the disclosure, server 120 will first initiate a setup procedure based on a discrete-logarithm type signature scheme to generate a master secret key "x" and a master public key "y". In the setup procedure, server 120 will first determine an appropriate cyclic group, G, with a prime order q, and a generator g of G.

Server 120 will then select a cryptographic collision-resistant hash function H: $\{0,1\}^* \rightarrow \{0,1\}^l$, whereby $l$ is an appropriate integer known to a person skilled in the art. Server 120 will also select an Authentication Data Deriving Function and a Key Deriving Function that is to be adopted for use in the system. In embodiments of the disclosure, the Authentication Data Deriving Function may include any algorithm or scheme for verifying the authenticity of a message such as a message authentication code (MAC), a message integrity code or a keyed hash function while the Key Deriving Function may include any scheme for deriving a secret key from a secret value such as a collision-resistant hash function. Once that is done, server 120 then proceeds to select the master secret key "x" from an allowed set of integers ($x \in \mathbb{Z}_q$) and the master public key "y" is set as $y=g^x$. It should be noted that the setup procedure described above is similar to the initial procedures for setting up a discrete-logarithm type of signature scheme such as, but not limited to, a Schnorr Signature Scheme or an ElGamal Signature scheme.

When entity 105 or 110 joins the system, a private key unique to each of these entities will be issued by secure server 120. These unique private keys once generated will then be communicated to each of these entities whereby the respective private keys will then be stored in the secure memory within each of entities 105 and 110.

In particular, when entity 105 registers itself with server 120, entity 105 will communicate its identity to server 120. The identity of entity 105 may comprise its user name, email address, telephone number, IP address, MAC address, or any alphanumeric combination that may be utilized to uniquely identify entity 105. Server 120 then selects a random number $r_{105}$ and utilizes the previously generated master secret key "x" and the identity of entity 105, $id_{105}$, to obtain a discrete-logarithm type digital signature of the identity of entity 105, $id_{105}$. A secret private key $sk_{105}$ for entity 105 is then set as the obtained discrete-logarithm type digital signature of the identity for entity 105, ($R_{105}$, $s_{105}$), i.e., $sk_{105}=(R_{105}, s_{105})$. Similarly, when entity 110 registers itself with server 120, entity 110 will also transmit its identity to server 120. Server 120 then selects a random number $r_{110}$ and utilizes the previously generated master secret key "x" and the identity of entity 110, $id_{110}$, to obtain the discrete-logarithm type digital signature of the identity of entity 110, $id_{110}$. A secret private key $sk_{110}$ for entity 110 is then set as the obtained discrete-logarithm type digital signature of the identity for entity 110, ($R_{110}$, $s_{110}$), i.e. $sk_{110}=(R_{110}, s_{110})$. For the two above mentioned secret private keys, $R_{105}$ and $R_{110}$ are group elements while $s_{105}$ and $s_{110}$ comprise integers modulo q, whereby q is a prime number. It should be noted that any discrete-logarithm type digital signature scheme where $s_{105}$ and $s_{110}$ may be checked by $g^s$ or $y^s$ in a corresponding signature verification algorithm may be employed in embodiments of the disclosure.

In an embodiment of the disclosure, the private key $sk_{105}$ may comprise a Schnorr signature of the identity of the first entity, $id_{105}$, where $R_{105}=g^{r_{105}}$, and $s_{105}=r_{105}+xH(R_{105}, id_{105})$(modulo q). Similarly, the private key $sk_{110}$ may comprise a Schnorr signature of the identity of the second entity, $id_{110}$, where, $R_{110}=g^{r_{110}}$, and $s_{110}=r_{110}+xH(R_{110}, id_{110})$(mod q). For the above two equations, $r_{105}$ and $r_{110}$ are random numbers, x is a master secret key, and H( ) is a collision-resistant hash function.

In another embodiment of the disclosure, the private key $sk_{105}$ is may comprise a variant of an ElGamal signature of the identity of the first entity, $id_{105}$, where $R_{105}=g^{r_{105}}$, and $s_{105}=x^{-1}(H(id_{105})-r_{105}\cdot R_{105})$(modulo q). Similarly, the private key $sk_{110}$ may comprise an ElGamal signature of the identity of the second entity, $id_{110}$, where $R_{110}=g^{r_{110}}$, and $s_{110}=x^{-1}(H(id_{110})-r_{110}\cdot R_{110})$(modulo q). For the above two equations, $r_{105}$ and $r_{110}$ are random numbers, x is a master secret key, and H( ) is a collision-resistant hash function.

In yet another embodiment of the disclosure, the private key $sk_{105}$ is may comprise another variant of an ElGamal signature of the identity of the first entity, $id_{105}$, where $R_{105}=g^{r_{105}}$, and $s_{105}=xR_{105}+r_{105}\cdot H(id_{105})$(modulo q). Similarly, the private key $sk_{110}$ may comprise another variant of an ElGamal signature of the identity of the second entity, $id_{110}$, where, $R_{110}=g^{r_{110}}$, and $s_{110}=xR_{110}+r_{110}\cdot H(id_{110})$ (modulo q). For the above two equations, $r_{105}$ and $r_{110}$ are random numbers, x is a master secret key, and H( ) is a collision-resistant hash function.

In still yet another embodiment of the disclosure, the private key $sk_{105}$ may comprise yet another variant of an ElGamal signature of the identity of the first entity, $id_{105}$, where $R_{105}=g^{r_{105}}$, and $s_{105}=x\cdot H(id_{105})+r_{105}\cdot R_{105}$(modulo q). Similarly, the private key $sk_{110}$ may comprise yet another variant of an ElGamal signature of the identity of the second entity, $id_{110}$, where, $R_{110}=g^{r_{110}}$, and $s_{110}=x\cdot H(id_{110})+r_{110}\cdot R_{110}$(modulo q). For the above two equations, $r_{105}$ and $r_{110}$ are random numbers, x is a master secret key, and H( ) is a collision-resistant hash function.

In still yet another embodiment of the disclosure, the private key $sk_{105}$ may comprise still yet another variant of an ElGamal signature of the identity of the first entity, $id_{105}$, where $R_{105}=g^{r_{105}}$, and $s_{105}=x^{-1}(R_{105}-r_{105}\cdot H(id_{105}))$(modulo q). Similarly, the private key $sk_{110}$ may comprise still yet another ElGamal signature of the identity of the second entity $id_{110}$, where $R_{110}=g^{r_{110}}$, and $s_{110}=x^{-1}(R_{110}-r_{110}\cdot H(id_{110}))$(modulo q). For the above two equations, $r_{105}$ and $r_{110}$ are random numbers, x is a master secret key, and H( ) is a collision-resistant hash function.

Once the private keys have been stored in the secure memory of the respective entities, the entity-pair, i.e. entity 105 and 110, may then commence authentication procedures. Upon successfully authenticating each other, the entity-pair may then proceed to generate a common session key for encoding or signing digital communications sent between each other.

Figure 3:
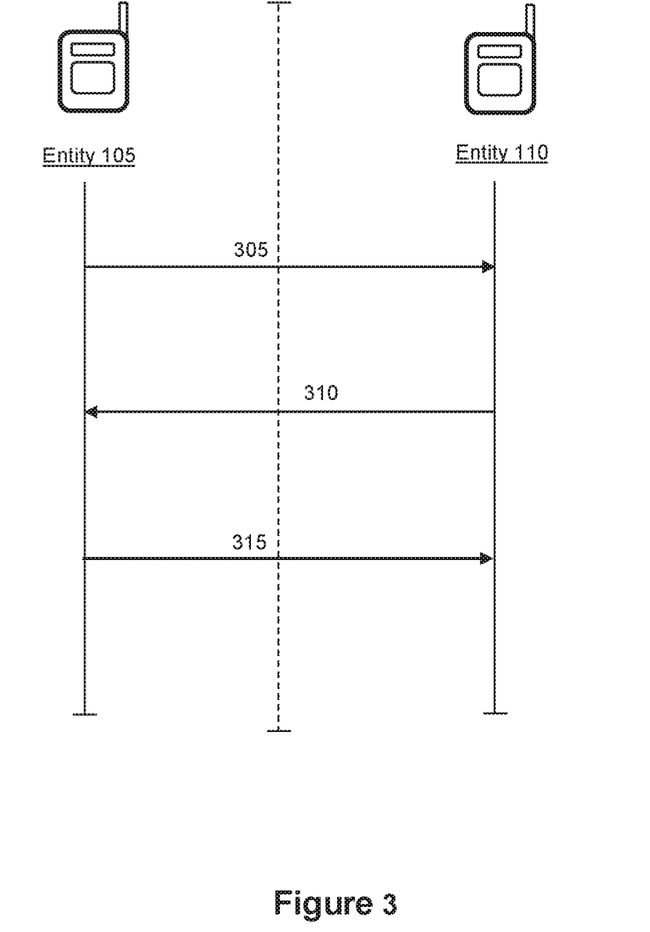
FIG. 3 illustrating a timing diagram for the authentication of an entity-pair and for the generation of a common session key for the authenticated entity-pair in accordance with embodiments of the disclosure.

With reference to FIG. 3, entity 105 initiates the authentication process with entity 110 by first selecting a cryptographic nonce, $N_{105}$. The selected cryptographic nonce may comprise any random or pseudo-random number. Entity 105 then proceeds, at step 305, to share the identity of entity 105, $id_{105}$, together with $R_{105}$ (as obtained from the secret private key of entity 105) and the pseudo-random nonce, $N_{105}$, with entity 110. Upon receiving the shared information, entity 110 will then proceed to calculate the implicitly shared secret $k_{110,105}$ where $k_{110,105}=g^{s_{105}\cdot s_{110}}$. It should be noted that in embodiments of the disclosure whereby the private key $sk_{110}$ comprises a variant of an ElGamal signature of the identity of the second entity as described in the embodiments above, the implicitly shared secret $k_{110,105}$ may be instead calculated as follows: $k_{110,105}=y^{s_{105}\cdot s_{110}}$, where $y=g^x$.

One skilled in the art will recognize that although the following sections references the embodiment whereby the private key $sk_{105}$ comprises a Schnorr signature of the identity of the first entity, $id_{105}$, where $R_{105}=g^{r_{105}}$, and $s_{105}=r_{105}+xH(R_{105}, id_{105})$(modulo q) and whereby the private key $sk_{110}$ comprises a Schnorr signature of the identity of the second entity, $id_{110}$, where, $R_{110}=g^{r_{110}}$, and $s_{110}=r_{110}+xH(R_{110}, id_{110})$(mod q), other types of discrete-logarithm type digital signature schemes as described above may be used in place of the Schnorr signature scheme without departing from the disclosure.

In this embodiment whereby the Schnorr signature scheme is adopted, when the implicitly shared secret $k_{110,105}$ is expanded further, this results in $k_{110,105}=R_{105}y^{H(R_{105},id_{105})\cdot s_{110}}$. Once this has been done, entity 110 then selects its own cryptographic nonce, $N_{110}$. The implicitly shared secret $k_{110,105}$, together with the cryptographic nonce $N_{105}$ and $N_{110}$ are then provided to an Authentication Data Function to generate authentication data $Ad_{110}$ where $Ad_{110}$=Authentication_Data_Function ($k_{110,105}$, $N_{105}$, $N_{110}$). In embodiments of the disclosure, the Authentication Data Function may be a Message Authentication Code Function which generates a MAC as its authentication data. Entity 110 then proceeds, at step 310, to share the identity of entity 110, $id_{110}$, together with $R_{110}$ (as obtained from the secret private key of entity 110), the cryptographic nonce, $N_{110}$, and the generated authentication data, $Ad_{110}$, with entity 105.

Once entity 105 receives the shared information, entity 105 will then proceed to calculate the implicitly shared secret $k_{105,110}$ where $k_{105,110}=g^{s_{110}\cdot s_{105}}$ or in this embodiment of the disclosure, when expanded further, $k_{105,110}=(R_{110}y^{H(R_{110},id_{110})})^{s_{105}}$. It is useful to note at this stage that $k_{105,110}=k_{110,105}$.

For this step, it should be noted that in embodiments of the disclosure whereby the private key $sk_{105}$ comprises a variant of an ElGamal signature of the identity of the first entity as described in the embodiments above, the implicitly shared secret $k_{105,110}$ may be instead calculated as follows: $k_{105,110}=y^{s_{110}\cdot s_{105}}$, where $y=g^x$.

The implicitly shared secret $k_{105,110}$, together with the cryptographic nonce $N_{105}$ and $N_{110}$ are then provided to the Authentication Data Function to determine whether the Authentication_Data_Function ($k_{105,110}$, $N_{105}$, $N_{110}$) matches with the authentication data, $Ad_{110}$, as shared by entity 110. If it is confirmed that the result of the Authentication_Data_Function ($k_{105,110}$, $N_{105}$, $N_{110}$) matches the authentication data, $Ad_{110}$, as shared by entity 110, this indicates that entity 110 has been authenticated. As such, entity 105 may then proceed to generate a common session key for use with entity 110. The common session key, $SK_{105,110}$, is calculated by providing implicitly shared secret $k_{105,110}$, the identities of entity 105 and 110, $id_{105}$, and $id_{110}$, and the cryptographic nonce $N_{105}$ and $N_{110}$ to the Key Deriving Function, that is $SK_{105,110}$=Key_Deriving_Function($k_{105,110}$, $id_{105}$, $id_{110}$, $N_{105}$, $N_{110}$). In embodiments of the disclosure, the Key Deriving Function may be a collision-resistant hash function.

After the common session key, $SK_{105,110}$, has been calculated by entity 105, the implicitly shared secret $k_{105,110}$, together with the cryptographic nonce $N_{110}$ and $N_{105}$ are then provided to the Authentication Data Function to generate authentication data $Ad_{105}$ where $Ad_{105}$=Authentication_Data_Function ($k_{105,110}$, $N_{110}$, $N_{105}$) and $Ad_{105}$ is then subsequently shared with entity 110 at step 315.

Upon receiving authentication data $Ad_{105}$, entity 110 will provide the implicitly shared secret $k_{110,105}$, together with the cryptographic nonce $N_{110}$ and $N_{105}$ to the Authentication Data Function to determine whether the Authentication_

Data_Function ($k_{110,105}$, $N_{110}$, $N_{105}$) matches with the authentication data, $Ad_{105}$, as shared by entity 105. If it is confirmed that the outcome of the Authentication_Data_Function ($k_{110,105}$, $N_{110}$, $N_{105}$) matches the authentication data, $Ad_{105}$, as shared by entity 105, this implies to entity 110 that entity 105 has been authenticated.

Hence, entity 110 may then proceed to generate a common session key for use with entity 105. The common session key, $SK_{110,105}$, is calculated by providing implicitly shared secret $SK_{100,105}$, the identities of entity 110, $id_{110}$, and 105, $id_{105}$, together with the cryptographic nonce $N_{110}$ and $N_{105}$ to the Key Deriving Function, that is $SK_{110,105}$=Key_Deriving_Function($k_{110,105}$, $id_{105}$, $id_{110}$, $N_{105}$, $N_{110}$). The common session key $SK_{110,105}$, as generated by entity 110 and the common session key $SK_{105,110}$, as generated by entity 105 may then be utilized to sign or encode digital messages between this entity-pair (105-110).

In another embodiment of the disclosure, instead of entity 105 initiating the authentication process by first selecting a cryptographic nonce, $N_{105}$, entity 105 will instead select a random number "a" and will utilize the random number "a" to calculate an intermediate Diffie-Helman value A where $A=g^a$. Entity 105 then proceeds, as previously described, to share the identity of entity 105, $id_{105}$, together with $R_{105}$ (as obtained from the secret private key of entity 105) and the intermediate secret, A, with entity 110. This takes place at step 305.

Upon receiving the shared information, entity 110 will then proceed to calculate the implicitly shared secret $k_{110,105}$ where $k_{110,105}=g^{s_{105} \cdot s_{110}}$ or when expanded further, $k_{110,105}=(R_{105}y^{H(R_{105},id_{105})})^{s_{110}}$. Once this has been done, entity 110 then selects a random number "b" and will then utilize the random number "b" to calculate intermediate Diffie-Hellman value B where $B=g^b$. The implicitly shared secret $k_{110,105}$, together with the intermediate secrets A and B are then provided to an Authentication Data Function to generate authentication data $Ad_{110}$ where $Ad_{110}$=Authentication_Data_Function ($k_{110,105}$, B, A).

Entity 110 then proceeds, at step 310, to share the identity of entity 110, $id_{110}$, together with $R_{110}$ (as obtained from the secret private key of entity 110), intermediate secret B, and the generated authentication data, $Ad_{110}$, with entity 105.

Once entity 105 receives the shared information, entity 105 will then proceed to calculate the implicitly shared secret $k_{105,110}$ where $k_{105,110}=g^{s_{110} \cdot s_{105}}$ or when expanded further, $k_{105,110}=(R_{110}y^{H(R_{110},id_{110})})^{s_{105}}$. The implicitly shared secret $k_{105,110}$, together with the intermediate secrets A and B are then provided to the Authentication Data Function to determine whether the Authentication_Data_Function ($k_{105,110}$, B, A) matches with the authentication data, $Ad_{110}$, as shared by entity 110. If it is confirmed that the result of the Authentication_Data_Function ($k_{105,110}$, B, A) matches the authentication data, $Ad_{110}$, as shared by entity 110, this indicates that entity 110 has been authenticated.

As such, entity 105 may then proceed to generate a common session key for use with entity 110. The common session key, $SK_{105,110}$, is calculated by providing implicitly shared secret $k_{105,110}$, the identities of entity 105 and 110, $id_{105}$, and $id_{110}$, the intermediate secret B, and the random number a to the Key Deriving Function, that is $SK_{105,110}$=Key_Deriving_Function($B^a$, $k_{105,110}$, $id_{105}$, $id_{110}$).

After the common session key, $SK_{105,110}$, has been calculated by entity 105, the implicitly shared secret $k_{105,110}$, together with the intermediate secrets A and B are then provided to the Authentication Data Function to generate authentication data $Ad_{105}$ where $Ad_{105}$=Authentication_Data_Function ($k_{105,110}$, A, B) and $Ad_{105}$ is then subsequently shared with entity 110 at step 315.

Upon receiving authentication data $Ad_{105}$, entity 110 will provide the implicitly shared secret $k_{110,105}$, together with the intermediate secrets A and B to the Authentication Data Function to determine whether the Authentication_Data_Function ($k_{110,105}$, A, B) matches with the authentication data, $Ad_{105}$, as shared by entity 105. If it is confirmed that the outcome of the Authentication_Data_Function ($k_{110,105}$, A, B) matches the authentication data, $Ad_{105}$, as shared by entity 105, this implies to entity 110 that entity 105 has been authenticated.

Hence, entity 110 may then proceed to generate a common session key for use with entity 105. The common session key, $SK_{110,105}$, is calculated by providing implicitly shared secret $k_{110,105}$, the identities of entity 110, $id_{110}$, and 105, $id_{105}$, together with the intermediate secret A and random number b to the Key Deriving Function, that is $SK_{110,105}$=Key_Deriving_Function($A^b$, $k_{110,105}$, $id_{105}$, $id_{110}$). The common session key $SK_{110,105}$, as generated by entity 110 and the common session key $SK_{105,110}$, as generated by entity 105 may then be utilized to sign or encode digital messages between this entity-pair (105-110).

In accordance with an embodiment of the disclosure, a method for generating a common session key $SK_{ij}$ for encoding digital communications between a first entity "i" and a second entity "j" comprises the following five steps:

Step 1, generating, by a secure server, a private key $sk_i$ for the first entity wherein the private key $sk_i$ comprises a Discrete-Logarithm type digital signature, [$R_i$, $s_i$], of an identity of the first entity, $id_i$, and generating, by the secure server, a private key $sk_j$ for the second entity wherein the private key $sk_j$ comprises a Discrete-Logarithm type digital signature, [$R_j$, $s_j$], of an identity of the second entity, $id_j$, wherein $R_i$ and $R_j$ are group elements, and $s_i$ and $s_j$ comprise integers modulo q, whereby q is a prime number, wherein the private key $sk_i$ is communicated to the first entity and the private key $sk_j$ is communicated to the second entity;

Step 2, sharing, by the first entity, a cryptographic nonce $N_i$, the identity of the first entity $id_i$, and $R_i$ with the second entity;

Step 3, calculating, by the second entity, an implicitly shared secret $k_{ji}$ using the shared $R_i$, and providing the implicitly shared secret $k_{ji}$, the cryptographic nonce $N_i$, and a cryptographic nonce $N_j$ to an Authentication Data Deriving Function to generate an authentication data $Ad_j$;

Step 4, sharing, by the second entity, the cryptographic nonce $N_j$, the identity of the second entity $id_j$, $R_j$, and the authentication data $Ad_j$ with the first entity; and Step 5, calculating, by the first entity, an implicitly shared secret $k_{ij}$ using the shared $R_j$ and verifying the authentication data $Ad_j$ using the implicitly shared secret $k_{ij}$, the cryptographic nonce $N_i$, and the cryptographic nonce $N_j$, wherein if the authentication data $Ad_j$ is verified, generating the common session key $SK_{ij}$ by providing the implicitly shared secret $k_{ij}$, the cryptographic nonce $N_i$, the cryptographic nonce $N_j$, the identity of the first entity $id_i$ and the identity of the second entity $id_j$ to a Key Deriving Function.

In order to provide such a system or method, a process is needed for generating secret private keys for entities of the system, and for authenticating an entity of an entity-pair before a common session key is generated for encoding or signing digital messages between the entity-pair. The following description and FIGS. 4-6 describe embodiments of processes that provide processes in accordance with this disclosure.

Figure 4:
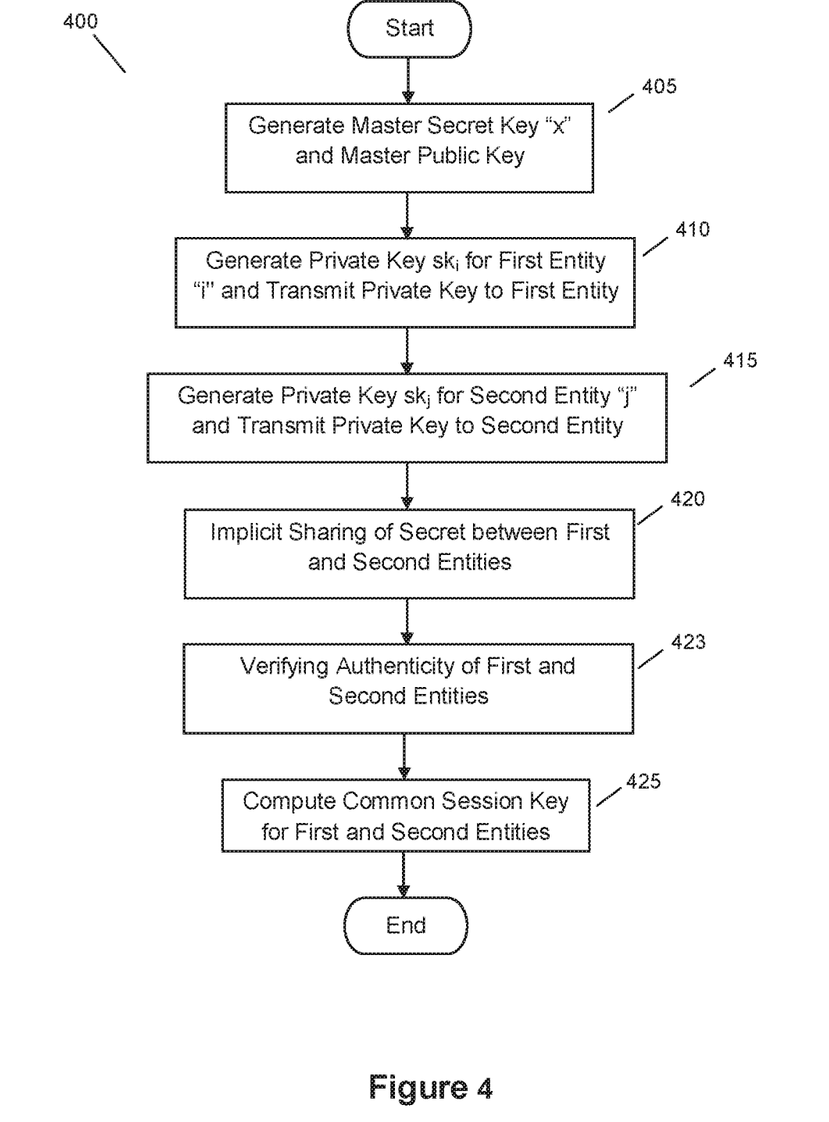
FIG. 4 illustrating a flow diagram of a process for verifying the authenticity of an entity-pair and for calculating a common session key for an entity-pair in accordance with embodiments of the disclosure.

FIG. 4 illustrates process 400 that is performed by a secure server, a first entity "i" and a second entity "j" for generating secret private keys for entities of the system, and for authenticating an entity of an entity-pair before a common session key is generated for encoding or signing digital messages between the entity-pair. Process 400 begins at step 405 with the secure server generating a master secret key "x" and a master public key "y". When first entity, i, registers itself with the secure server, the secure server will generate a secret private key, $sk_i$, for the first entity using the first entity's identity, $id_i$. The private key $sk_i$ may comprise a Discrete-Logarithm type digital signature, $[R_j, s_j]$, of an identity of the first entity, $id_i$, wherein $R_i$ is a group element, and $s_i$ comprises an integer modulo q, whereby q is a prime number. In an embodiment of the disclosure, the secret private key $sk_i$ is a Schnorr signature comprising $[R_i=g^{r_i}, s_i=r_i+xH(R_i, id_i)]$, where g is a generator of a cyclic group G, $r_i$ is a random number, and H( ) is a collision-resistant hash function. The secret private key $sk_i$ is then transmitted to the first entity and stored securely within the first entity. All this takes place at step 410.

At step 415, when the next entity, that is when second entity, j, registers itself with the secure server, the secure server will generate a secret private key, $sk_j$, for the second entity using the second entity's identity, $id_j$. The private key $sk_j$ comprises a Discrete-Logarithm type digital signature, $[R_j, s_j]$, of an identity of the second entity, $id_j$, wherein $R_j$ is a group element, and $s_j$ comprises an integer modulo q, whereby q is a prime number. In this embodiment of the disclosure, the secret private key $sk_j$ is a Schnorr signature comprising $[R_j=g^{r_j}, s_j=r_j+xH(R_j, id_j)]$, where g is a generator of a cyclic group G, $r_j$ is a random number, and H( ) is a collision-resistant hash function. The secret private key $sk_j$ is then transmitted to the second entity and stored securely within the second entity.

The first and second entities then exchange implicit secrets with one another at step 420. The shared implicit secrets are then utilized to calculate authentication data for the first entity and the second entity. The calculated authentication data is then exchanged at step 423 and is utilized by each entity to verify the authenticity of the other entity. For example, the second entity will calculate authentication data, $Ad_j$, and will transmit this authentication data together to the first entity. The first entity will then utilize the previously received implicit secret data from the second entity to determine the veracity of the received authentication data, $Ad_j$. This process is then repeated with the first entity calculating and transmitting its authentication data, $Ad_i$, to the second entity whereby the second entity then utilizes the previously received implicit secret data from the first entity to determine the veracity of the received authentication data, $Ad_i$.

Once the entities have been authenticated, at step 425, the first and the second entities will then generate a common session key using the shared implicit secrets. The generated common session key may then be used to sign or encode any digital messages that are exchanged between the first and second entities. Process 400 then ends.

Figure 5:
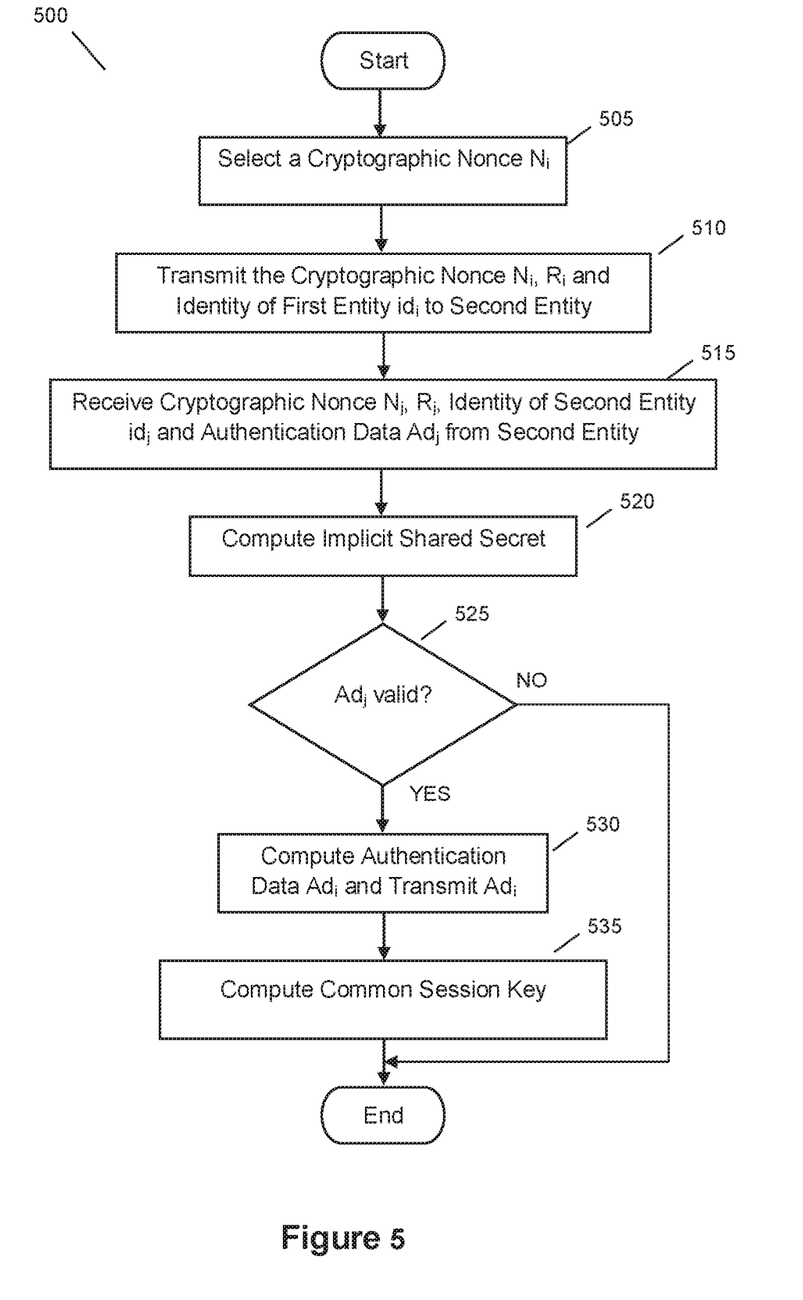
FIG. 5 illustrating a flow diagram of a process for verifying the authenticity of a second entity and for generating a common session key at a first entity in accordance with embodiments of the disclosure.

FIG. 5 illustrates process 500 that is performed by the first entity, i, to authenticate a second entity and to generate a common session key in accordance with embodiments of this disclosure. Before process 500 commences, it should be noted that a secret private key, $sk_i$, comprising $[R_i, s_i]$, would have been previously communicated and stored within the first entity.

Process 500 begins at step 505 whereby process 500 selects a cryptographic nonce, $N_i$. At step 510, the cryptographic nonce, $N_i$, $R_i$ (as obtained from $sk_i$), and the identity of the first entity, $id_i$, are all shared with the second entity, j. In return, the second entity, will then share with the first entity its cryptographic nonce, $N_j$, $R_j$ (as obtained from the second entity's private secret key), the identity of the second entity, $id_j$, and authentication data, $Ad_j$. This takes place at step 515.

Process 500 will then calculate the implicit shared secret at step 520. The implicit shared secret at the first entity may be represented as: $k_{ij}=g^{s_i \cdot s_j}$ or in this embodiment of the disclosure, when expanded further as: $k_{ij}=(R_j y^{H(R_j,id_j)})^{s_i}$. At step 525, process 500 will then utilize the calculated implicit shared secret, $k_{ij}$, and the cryptographic nonces $N_i$ and $N_j$ to verify the authenticity of the information sent by the second entity. This is done by verifying if the outcome of the Authentication_Data_Function($k_{ij}$, $N_i$, $N_j$) matches with the received authentication data, $Ad_j$. If process 500 determines that the second entity is an authenticated entity, i.e. the outcome of the Authentication Data Function above matches with the received authentication data, $Ad_j$, process 500 will then proceed to step 530 whereby process 500 calculates the authentication data, $Ad_i$, of the first entity by applying the following function: Authentication_Data_Function($k_{ij}$, $N_j$, $N_i$).

This authentication data, $Ad_i$, is then subsequently transmitted to the second entity. Process 500 will then proceed to calculate the common session key, SKij by solving the following function: Key_Deriving_Function($k_{ij}$, $id_i$, $id_j$, $N_i$, $N_j$). Process 500 then ends.

Conversely, if at step 525 process 500 is unable to verify the authenticity of the second entity, i.e. if the outcome of the Authentication_Data_Function($k_{ij}$, $N_i$, $N_j$) does not match with the received authentication data, $Ad_j$, process 500 will end there.

In another embodiment of the disclosure, at step 525, process 500 may verify the authenticity of the information sent by the second entity by first calculating the common session key $SK_{ij}$ and replacing the implicit shared secret $k_{ij}$ in the Authentication Data Function with the common session key $SK_{ij}$ instead. This means that if the outcome of the Authentication_Data_Function($SK_{ij}$, $N_i$, $N_j$) matches with the received authentication data, $Ad_j$, this implies that $Ad_j$ is valid. Process 500 will then proceed to step 530. At step 530, process 500 will then proceed to calculate the authentication data, $Ad_i$, of the first entity by applying the following function: Authentication_Data_Function($SK_{ij}$, $N_j$, $N_i$). This authentication data, $Ad_i$, is then subsequently transmitted to the second entity. In this embodiment of the disclosure, as the common session key for the first entity, i.e. $SK_{ij}$, has already been calculated at step 525, process 500 will then skip step 535 and process 500 then ends.

Figure 6:
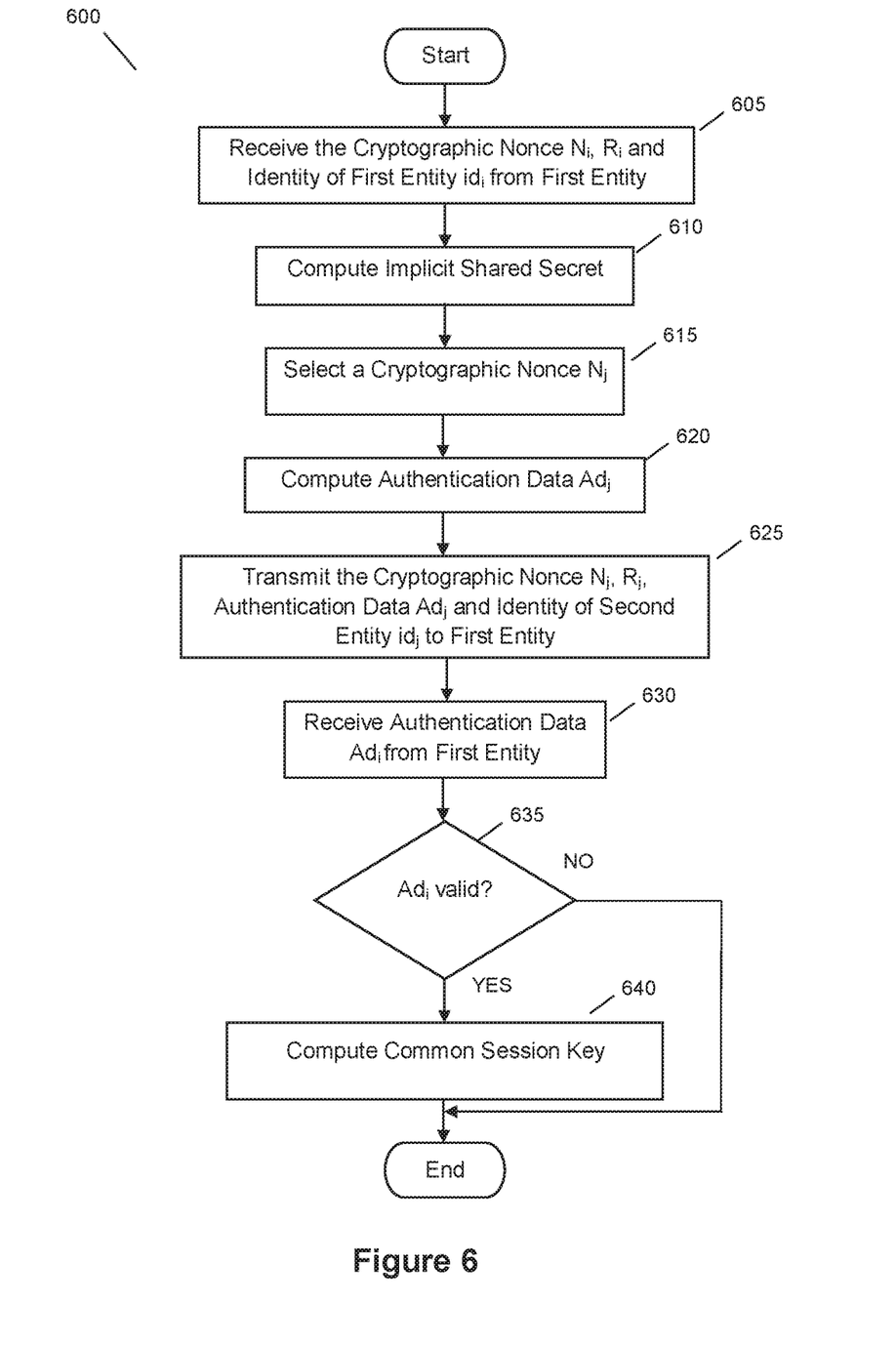
FIG. 6 illustrating a flow diagram of a process for verifying the authenticity of a first entity and for generating a common session key at a second entity in accordance with embodiments of the disclosure.

FIG. 6 illustrates process 600 that is performed by the second entity, j, to authenticate a first entity, i, and to generate a common session key in accordance with embodiments of this disclosure. Before process 600 commences, it should be noted that a secret private key, $sk_j$, comprising $[R_j, s_j]$, would have been previously communicated and stored within the second entity.

Process 600 begins at step 605 whereby process 600 receives the cryptographic nonce, $N_i$, $R_i$ (as obtained from $sk_i$), and the identity of the first entity, $id_i$, from the first entity, i. With this received information, process 600 then proceeds to calculate the implicit shared secret at step 610. The implicit shared secret at the second entity may be represented as: $k_{ji}=g^{s_j \cdot s_i}$ or in accordance with this embodiment of the disclosure, when expanded further as: $k_{ji}=(R_i y^{H(R_i, id_i)})^{s_j}$. At step 615, process 600 will then proceed to select a cryptographic nonce, $N_j$. Process 600, at step 620, then utilizes the calculated implicit shared secret, $k_{ji}$, and the cryptographic nonces $N_i$ and $N_j$ to calculate the authentication data, $Ad_j$, of the second entity by applying the following function: Authentication_Data_Function($k_{ji}$, $N_i$, $N_j$). At the next step, i.e. step 625, process 600 will then transmit the calculated authentication data, $Ad_j$, the cryptographic nonce, $N_j$, $R_j$ (as obtained from $sk_j$), and the identity of the second entity, Idj, to the first entity. In return, process 600 will receive authentication data, $Ad_i$, from the first entity at step 630.

At step 635, process 600 will then utilize the calculated implicit shared secret, $k_{ji}$, and the cryptographic nonces $N_i$ and $N_j$ to verify the authenticity of the information previously received at step 605 from the first entity. This is done by verifying if the outcome of the Authentication_Data_Function($k_{ji}$, $N_j$, $N_i$) matches with the received authentication data, $Ad_i$. If process 600 determines that the first entity is an authenticated entity, i.e. the outcome of the Authentication Data Function matches with the received authentication data, $Ad_i$, process 600 will then proceed to step 640 whereby process 600 calculates the common session key, SKji by solving the following function: Key_Deriving_Function($k_{ji}$, $id_i$, $id_j$, $N_i$, $N_j$). Process 600 then ends.

Conversely, if at step 635 process 600 is unable to verify the authenticity of the second entity, i.e. if the outcome of the Authentication_Data_Function($k_{ji}$, $N_j$, $N_i$) does not match with the received authentication data, $Ad_i$, process 600 will end there.

In another embodiment of the disclosure, at step 620, instead of utilizing the calculated implicit shared secret, $k_{ji}$, to calculate the authentication data, $Ad_j$, of the second entity, process 600 first calculates the common session key of the second entity, i.e. $SK_{ji}$, and utilizes this common session key $SK_{ji}$ in place of the implicit shared secret $k_{ji}$ to calculate the authentication data, $Ad_j$. This means that the authentication data, $Ad_j$, is obtained by solving the following function: Authentication_Data_Function($SK_{ji}$, $N_i$, $N_j$). At step 625, process 600 will then transmit the calculated authentication data, $Ad_j$, the cryptographic nonce, $N_j$, $R_j$ (as obtained from $sk_j$), and the identity of the second entity, Idj, to the first entity.

Similarly, process 600 will receive authentication data, $Ad_i$, from the first entity at step 630. At step 635, process 600 will then utilize the common session key, $SK_{ji}$, and the cryptographic nonces $N_i$ and $N_j$ to verify the authenticity of the information previously received at step 605 from the first entity. This is done by verifying if the outcome of the Authentication_Data_Function($SK_{ji}$, $N_j$, $N_i$) matches with the received authentication data, $Ad_i$. In this embodiment of the disclosure, as the common session key for the second entity, i.e. $SK_{ji}$, has already been calculated at step 620, process 600 will then skip step 640 and process 600 then ends.

The above is a description of embodiments of a system and process in accordance with the present disclosure as set forth in the following claims. It is envisioned that others may and will design alternatives that fall within the scope of the following claims.

What is claimed is:

1. A method of generating a common session key $SK_{ij}$ for encoding digital communications between a first entity and a second entity, comprising:
generating, by a secure server, a private key $sk_i$ for the first entity, wherein the private key $sk_i$ comprises a Discrete-Logarithm type digital signature [$R_i$, $s_i$], of an identity of the first entity $id_i$, and generating, by the secure server, a private key $sk_j$ for the second entity wherein the private key $sk_j$ comprises a Discrete-Logarithm type digital signature [$R_j$, $s_j$], of an identity of the second entity $id_j$, wherein $R_i$ and $R_j$ are group elements, and $s_i$ and $s_j$ comprise integers modulo q, whereby q is a prime number, wherein the private key $sk_i$ is communicated to the first entity and the private key $sk_j$ is communicated to the second entity;
sharing, by the first entity, a cryptographic nonce $N_i$, the identity of the first entity $id_i$, and $R_i$ with the second entity;
calculating, by the second entity, an implicitly shared secret $k_{ji}$ using the shared $R_i$, and providing the implicitly shared secret $k_{ji}$, the cryptographic nonce $N_i$, and a cryptographic nonce $N_j$ to an Authentication Data Deriving Function to generate an authentication data $Ad_j$;
sharing, by the second entity, the cryptographic nonce $N_j$, the identity of the second entity $id_j$, $R_j$, and the authentication data $Ad_j$ with the first entity; and
calculating, by the first entity, an implicitly shared secret $k_{ij}$ using the shared $R_j$ and verifying the authentication data $Ad_j$ using the implicitly shared secret $k_{ij}$, the cryptographic nonce $N_i$, and the cryptographic nonce $N_j$, wherein if the authentication data $Ad_j$ is verified, generating the common session key $SK_{ij}$ by providing the implicitly shared secret $k_{ij}$, the cryptographic nonce $N_i$, the cryptographic nonce $N_j$, the identity of the first entity $id_i$ and the identity of the second entity $id_j$ to a Key Deriving Function.

2. The method according to claim 1 further comprising:
providing, by the first entity, the implicitly shared secret $k_{ij}$, the cryptographic nonce $N_i$, and the cryptographic nonce $N_j$ to the Authentication Data Deriving Function to generate an authentication data $Ad_i$, and communicating the authentication data $Ad_i$ to the second entity; and
verifying, by the second entity, the authentication data $Ad_i$ using the implicitly shared secret $k_{ji}$, wherein if the authentication data $Ad_i$ is verified, providing the implicitly shared secret $k_{ji}$, the cryptographic nonce $N_i$, the cryptographic nonce $N_j$, the identity of the first entity $id_i$ and the identity of the second entity $id_j$ to the Key Deriving Function to generate the common session key $SK_{ij}$.

3. The method according to claim 1, wherein the generation of the authentication data $Ad_j$ further comprises providing the identity of the first entity $id_i$ and the identity of the second entity $id_j$ to the Authentication Data Deriving Function.

4. The method according to claim 2, wherein the generation of the authentication data $Ad_i$ further comprises providing the identity of the first entity $id_i$ and the identity of the second entity $id_j$ to the Authentication Data Deriving Function.

5. The method according to claim 1, wherein the verifying the authentication data $Ad_j$ comprises:
providing the implicitly shared secret $k_{ij}$, the cryptographic nonce $N_i$, and the cryptographic nonce $N_j$ to the Authentication Data Deriving Function to obtain a result, and determining if the result matches with authentication data $Ad_j$, wherein if a match is found, verifying the authentication data $Ad_j$.

6. The method according to claim 2, wherein the verifying the authentication data $Ad_i$ comprises:
providing the implicitly shared secret $k_{ji}$, the cryptographic nonce $N_i$, and the cryptographic nonce $N_j$ to the Authentication Data Deriving Function to obtain a result, and determining if the result matches with the authentication data $Ad_i$, wherein if a match is found, verifying the authentication data $Ad_i$.

7. The method according to claim 1, wherein the cryptographic nonce $N_i$ comprises $g^a$ where a is a random number and wherein g is a generator of a cyclic group G.

8. The method according to claim 1, wherein the cryptographic nonce $N_j$ comprises $g^b$ where b is a random number and wherein g is a generator of a cyclic group G.

9. The method according to claim 1, wherein the private key $sk_i$ is a Schnorr signature of the identity of the first entity, $id_i$, wherein $R_i=g^{r_i}$, and $s_i=r_i+xH(R_i, id_i)$ (modulo q), and wherein the private key $sk_j$ is a Schnorr signature of the identity of the second entity, $id_j$, wherein $R_j=g^{r_j}$ and $s_j=r_j+xH(R_j, id_j)$ (modulo q), where $r_i$ and $r_j$ are random numbers, x is a master secret key, and H( ) is a collision-resistant hash function, and
wherein the implicitly shared secret $k_{ji}=g^{si \cdot sj}$, and the implicitly shared secret $k_{ij}=g^{sj \cdot si}$, wherein g is a generator of a cyclic group G.

10. The method according to claim 1, wherein the private key $sk_i$ is a first variant of an El Gamal signature of the identity of the first entity $id_i$, wherein $R_i=g^{r_i}$, and $s_i=x^{-1} \cdot (H(id_i) - r_i \cdot R_i)$ (modulo q), and wherein the private key $sk_j$ is a first variant of an El Gamal signature of the identity of the second entity $id_j$, wherein $R_j=g^{r_j}$ and $s_j=x^{-1} \cdot (H(id_j) - r_j \cdot R_j)$ (modulo q), where $r_i$ and $r_j$ are random numbers, x is a master secret key, H( ) is a collision-resistant hash function and,
wherein the implicitly shared secret $k_{ji}=y^{si \cdot sj}$, and the implicitly shared secret $k_{ij}=y^{sj \cdot si}$, wherein $y=g^x$ is master public key, and wherein g is a generator of a cyclic group G.

11. The method according to claim 1, wherein the private key $sk_i$ is a second variant of an El Gamal signature of the identity of the first entity $id_i$, wherein $R_i=g^{r_i}$, and $s_i=xR_i+r_i \cdot (H(id_i))$ (modulo q), and wherein the private key $sk_j$ is a second variant of an El Gamal signature of the identity of the second entity $id_j$, wherein $R_j=g^{r_j}$ and $s_j=xR_j+r_j \cdot (H(id_j))$ (modulo q), wherein $r_i$ and $r_j$ are random numbers, x is a master secret key, and H( ) is a collision-resistant hash function, and
wherein the implicitly shared secret $k_{ji}=g^{si \cdot sj}$, and the implicitly shared secret $k_{ij}=g^{sj \cdot si}$, and wherein g is a generator of a cyclic group G.

12. The method according to claim 1, wherein the private key $sk_i$ is a third variant of an El Gamal signature of the identity of the first entity $id_i$, wherein $R_i=g^{r_i}$, and $s_i=x \cdot (H(id_i))+r_i \cdot R_i$ (modulo q), and wherein the private key $sk_j$ is a third variant of an El Gamal signature of the identity of the second entity $id_j$, wherein $R_j=g^{r_j}$ and $s_j=x \cdot (H(id_j))+r_j \cdot R_j$ (modulo q), wherein $r_i$ and $r_j$ are random numbers, x is a master secret key, and H( ) is a collision-resistant hash function, and
wherein the implicitly shared secret $k_{ji}=g^{si \cdot sj}$, and the implicitly shared secret $k_{ij}=g^{sj \cdot si}$, and wherein g is a generator of a cyclic group G.

13. The method according to claim 1, wherein the private key $sk_i$ is a fourth variant of an El Gamal signature of the identity of the first entity $id_i$, wherein $R_i=g^{r_i}$, and $s_i=x^{-1} \cdot (R_i - r_i \cdot (H(id_i)))$ (modulo q), and wherein the private key $sk_j$ is a fourth variant of an El Gamal signature of the identity of the second entity $id_j$, wherein $R_j=g^{r_j}$ and $s_j=x^{-1} \cdot (R_j - r_j \cdot (H(id_j)))$ (modulo q), where $r_i$ and $r_j$ are random numbers, x is a master secret key, and H( ) is a collision-resistant hash function and,
wherein the implicitly shared secret $k_{ji}=y^{si \cdot sj}$, and the implicitly shared secret $k_{ij}=y^{sj \cdot si}$, wherein $y=g^x$ is master public key, and wherein g is a generator of a cyclic group G.

14. A method of generating a common session key $SK_{ij}$ for encoding digital communications between a first entity and a second entity, comprising:
generating, by a secure server, a private key $sk_i$ for the first entity wherein the private key $sk_i$ comprises a Discrete-Logarithm type digital signature $[R_i, s_i]$, of an identity of the first entity $id_i$, and generating, by the secure server, a private key $sk_j$ for the second entity, wherein the private key $sk_j$ comprises a Discrete-Logarithm type digital signature $[R_j, s_j]$, of an identity of the second entity $id_j$, wherein $R_i$ and $R_j$ are group elements, and $s_i$ and $s_j$ comprise integers modulo q, wherein q is a prime number, wherein the private key $sk_i$ is communicated to the first entity and the private key $sk_j$ is communicated to the second entity;
sharing, by the first entity, a cryptographic nonce $N_i$, the identity of the first entity $id_i$, and $R_i$ with the second entity;
calculating, by the second entity, an implicitly shared secret $k_{ji}=g^{si \cdot sj}$, using the shared $R_i$, wherein g is a generator of a cyclic group G, and calculating the common session key $SK_{ji}$ by providing the implicitly shared secret $k_{ji}$, the cryptographic nonce $N_i$, the cryptographic nonce $N_j$, the identity of the first entity $id_i$ and the identity of the second entity $id_j$ to the Key Deriving Function, and providing the common session key $SK_{ji}$, the cryptographic nonce $N_i$, and a cryptographic nonce $N_j$ to an Authentication Data Deriving Function to generate an authentication data $Ad_j$;
sharing, by the second entity, the cryptographic nonce $N_j$, the identity of the second entity $id_j$, $R_j$, and the authentication data $Ad_j$ with the first entity; and
calculating, by the first entity, an implicitly shared secret $k_{ij}=g^{sj \cdot si}$, using the shared $R_j$, and calculating a common session key $SK_{ij}$ by providing the implicitly shared secret $k_{ij}$, the cryptographic nonce $N_i$, the cryptographic nonce $N_j$, the identity of the first entity $id_i$ and the identity of the second entity $id_j$ to the Key Deriving Function and verifying the authentication data $Ad_j$ using the common session key $SK_{ij}$, the cryptographic nonce $N_i$, and the cryptographic nonce $N_j$, wherein if the authentication data $Ad_j$ is verified, using the common session key $SK_{ij}$ or $SK_{ji}$ as the common session key for encoding digital communications between a first entity and a second entity.

15. A system for generating a common session key $SK_{ij}$ for encoding digital communications between a first entity and a second entity, comprising:
a secure server configured to:
share a private key $sk_i$ for the first entity, wherein the private key $sk_i$ comprises a Discrete-Logarithm type digital signature $[R_i, s_i]$, of an identity of the first entity $id_i$; and generate a private key $sk_j$ for the second entity, wherein the private key $sk_j$ comprises a Discrete-Logarithm type digital signature $[R_j, s_j]$, of an identity of the second entity $id_j$, wherein $R_i$ and $R_j$ are group elements, and $s_i$ and $s_j$ comprise integers modulo q, wherein q is a prime number, and wherein the private key $sk_i$ is communicated to the first entity and the private key $sk_j$ is communicated to the second entity;

wherein the first entity configured to share a cryptographic nonce $N_i$, the identity of the first entity $id_i$, and $R_i$ with the second entity;

wherein the second entity configured to calculate an implicitly shared secret $k_{ji}$ using the shared $R_i$, and providing the implicitly shared secret $k_{ji}$, the cryptographic nonce $N_i$, and a cryptographic nonce $N_j$ to an Authentication Data Deriving Function to generate an authentication data $Ad_j$;

wherein the second entity configured to share the cryptographic nonce $N_j$, the identity of the second entity $id_j$, $R_j$, and the authentication data $Ad_j$ with the first entity; and wherein the first entity configured to calculate the implicitly shared secret $k_{ij}=g^{sj \cdot si}$, using the shared $R_j$ and verifying the authentication data $Ad_j$ using the implicitly shared secret $k_{ij}$, the cryptographic nonce $N_i$, and the cryptographic nonce $N_j$, wherein if the authentication data $Ad_j$ is verified, generating the common session key $SK_{ij}$ by providing the implicitly shared secret $k_{ij}$, the cryptographic nonce $N_i$, the cryptographic nonce $N_j$, the identity of the first entity $id_i$ and the identity of the second entity $id_j$ to a Key Deriving Function.

16. A system for generating a common session key $SK_{ij}$ for encoding digital communications between a first entity and a second entity, comprising:

a secure server configured to:

generate a private key $sk_i$ for the first entity, wherein the private key $sk_i$ comprises a Discrete-Logarithm type digital signature $[R_i, s_i]$, of an identity of the first entity $id_i$; and generate a private key $sk_j$ for the second entity, wherein the private key $sk_j$ comprises a Discrete-Logarithm type digital signature $[R_j, s_j]$, of an identity of the second entity $id_j$, wherein $R_i$ and $R_j$ are group elements, and $s_i$ and $s_j$ comprise integers modulo q, wherein q is a prime number, wherein the private key $sk_i$ is communicated to the first entity and the private key $sk_j$ is communicated to the second entity;

wherein the first entity configured to share a cryptographic nonce $N_i$, the identity of the first entity $id_i$, and $R_i$ with the second entity;

wherein the second entity configured to calculate an implicitly shared secret $k_{ji}=g^{si \cdot sj}$, using the shared $R_i$, wherein g is a generator of a cyclic group G, and calculating the common session key $SK_{ji}$ by providing the implicitly shared secret $k_{ji}$, the cryptographic nonce $N_i$, the cryptographic nonce $N_j$, the identity of the first entity $id_i$ and the identity of the second entity $id_j$ to the Key Deriving Function, and providing the common session key $SK_{ji}$, the cryptographic nonce $N_i$, and a cryptographic nonce $N_j$ to an Authentication Data Deriving Function to generate an authentication data $Ad_j$;

wherein the second entity configured to share the cryptographic nonce $N_j$, the identity of the second entity $id_j$, $R_j$, and the authentication data $Ad_j$ with the first entity; and wherein the first entity configured to calculate an implicitly shared secret $k_{ij}=g^{sj \cdot si}$, using the shared $R_j$, and calculating a common session key $SK_{ij}$ by providing the implicitly shared secret $k_{ij}$, the cryptographic nonce $N_i$, the cryptographic nonce $N_j$, the identity of the first entity $id_i$ and the identity of the second entity $id_j$ to the Key Deriving Function and verifying the authentication data $Ad_j$ using the common session key $SK_{ij}$, the cryptographic nonce $N_i$, and the cryptographic nonce $N_j$, wherein if the authentication data $Ad_j$ is verified, using the common session key $SK_{ij}$ or $SK_{ji}$ as the common session key for encoding digital communications between a first entity and a second entity.

* * * * *

UNITED STATES PATENT AND TRADEMARK OFFICE
CERTIFICATE OF CORRECTION

PATENT NO.        : 11,044,081 B2
APPLICATION NO.   : 16/258109
DATED             : June 22, 2021
INVENTOR(S)       : Yang et al.

It is certified that error appears in the above-identified patent and that said Letters Patent is hereby corrected as shown below:

In the Claims

Claim 9: Column 17, Line 25: "xH($R_j$, $id_j$) (modulo q), where $r_i$ and $r_j$ are random numbers," should read -- xH($R_j$, $id_j$) (modulo q), wherein $r_i$ and $r_j$ are random numbers, --.

Claim 10: Column 17, Line 37: "(modulo q), where $r_i$ and $r_j$ are random numbers, x is a" should read -- (modulo q), wherein $r_i$ and $r_j$ are random numbers, x is a --.

Claim 12: Column 17, Line 61: "second entity, $id_j$, wherein $R_j = g^r_j$ and $s_j = x \cdot H(id_j) + r_j \cdot R_j$" should read -- second entity, $id_j$, where $R_j = g^r_j$ and $s_j = x \cdot H(id_j) + r_j \cdot R_j$ --.

Claim 13: Column 18, Line 7: "($id_j$)) (modulo q), where $r_i$ and $r_j$ are random numbers, x is" should read -- ($id_j$)) (modulo q), wherein $r_i$ and $r_j$ are random numbers, x is --.

Signed and Sealed this
Second Day of August, 2022

Katherine Kelly Vidal
*Director of the United States Patent and Trademark Office*